(12) United States Patent
Kwon et al.

(10) Patent No.: US 9,777,803 B2
(45) Date of Patent: Oct. 3, 2017

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Jae Chang Kook, Hwaseong-si (KR); Dong Hwan Hwang, Seoul (KR); Seong Wook Hwang, Gunpo-si (KR); Chang Wook Lee, Suwon-si (KR); Seongwook Ji, Ansan-si (KR); Wonmin Cho, Hwaseong-si (KR); JongSool Park, Hwaseong-si (KR); KyeongHun Lee, Seoul (KR); Jong Soo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/936,348

(22) Filed: Nov. 9, 2015

(65) Prior Publication Data
US 2017/0074357 A1    Mar. 16, 2017

(30) Foreign Application Priority Data

Sep. 14, 2015    (KR) .................. 10-2015-0129855

(51) Int. Cl.
*F16H 3/66*    (2006.01)
(52) U.S. Cl.
CPC ........ *F16H 3/66* (2013.01); *F16H 2200/0065* (2013.01); *F16H 2200/2012* (2013.01); *F16H 2200/2046* (2013.01)

(58) Field of Classification Search
CPC ..... F16H 2200/0065; F16H 2200/2012; F16H 2200/2046; F16H 3/66
See application file for complete search history.

(56) References Cited

U.S. PATENT DOCUMENTS 4,070,927 A * 1/1978 Polak .................. F16H 3/66
                                                     475/275
7,985,159 B2  7/2011 Phillips et al.
(Continued)

FOREIGN PATENT DOCUMENTS

| JP | 2013-190048 A | 9/2013 |
|---|---|---|
| JP | 2013-204708 A | 10/2013 |
| KR | 10-2013-00001271 A | 1/2013 |

*Primary Examiner* — Erin D Bishop
(74) *Attorney, Agent, or Firm* — Brinks Gilson & Lione

(57) ABSTRACT

A planetary gear train of an automatic transmission provides a planetary gear train that includes an input shaft receiving torque of an engine. An output shaft outputs changed torque. Four planetary gear sets include twelve rotation elements. Six friction elements are disposed between rotation elements or between a rotation element and a transmission housing. The input shaft is connected to the second rotation element and selectively connected to the twelfth rotation element. The output shaft is connected to the eleventh rotation element. The first rotation element is connected to the fourth rotation element, the fifth rotation element is connected to the eighth rotation element, the sixth rotation element is connected to the tenth rotation element, the ninth rotation element is connected to the eleventh rotation element, and three friction elements among the six friction elements are operated at each speed stage.

11 Claims, 2 Drawing Sheets

(56) References Cited

U.S. PATENT DOCUMENTS

Figure 1:
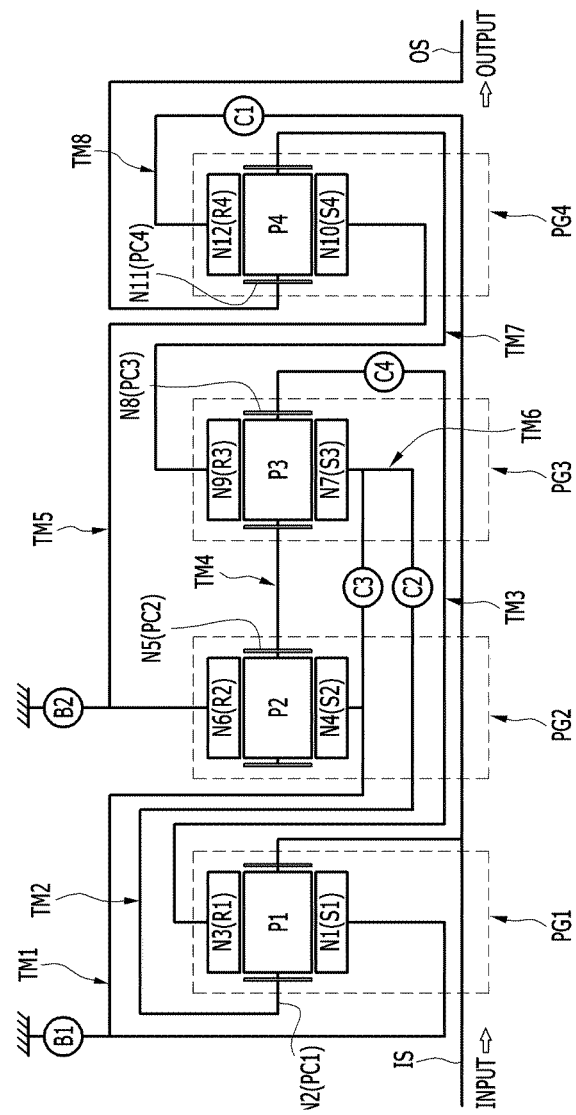

| | | | |
|---|---|---|---|
| 2010/0331138 A1* | 12/2010 | Phillips | F16H 3/66 475/278 |
| 2013/0085033 A1* | 4/2013 | Wittkopp | F16H 3/66 475/275 |
| 2014/0073473 A1* | 3/2014 | Maurer | F16H 3/66 475/279 |
| 2014/0179487 A1* | 6/2014 | Thomas | F16H 3/62 475/275 |

* cited by examiner

FIG. 2

| Speed stage | Friction element | | | | | | Gear ratio | Step ratio | Span of gear ratio |
|---|---|---|---|---|---|---|---|---|---|
| | C1 | C2 | C3 | C4 | B1 | B2 | | | |
| D1 | | ● | ● | | | ● | 4.503 | - | 9.227 |
| D2 | | | ● | ● | | ● | 2.794 | 1.612 | |
| D3 | | ● | | ● | | ● | 1.932 | 1.446 | |
| D4 | ● | ● | | | | ● | 1.368 | 1.412 | |
| D5 | ● | ● | ● | | | | 1.000 | 1.368 | |
| D6 | ● | ● | | | ● | | 0.797 | 1.255 | |
| D7 | ● | | | ● | ● | | 0.695 | 1.147 | |
| D8 | | ● | | ● | ● | | 0.559 | 1.242 | |
| D9 | | | ● | ● | ● | | 0.488 | 1.146 | |
| REV | | ● | | | ● | ● | -3.830 | - | - |

PLANETARY GEAR TRAIN OF AUTOMATIC TRANSMISSION FOR VEHICLE

CROSS-REFERENCE TO RELATED APPLICATIONS

This application claims the benefit of Korean Patent Application No. 10-2015-0129855, filed on Sep. 14, 2015, the contents of which are incorporated herein by reference in its entirety.

FIELD

The present disclosure relates to a planetary gear train of an automatic transmission for a vehicle.

BACKGROUND

The statements in this section merely provide background information related to the present disclosure and may not constitute prior art.

In recent years, a rise in oil price causes dashing into unlimited competition for enhancing fuel efficiency.

As a result, research into reduction of weight and the enhancement of fuel efficiency through downsizing is conducted in the case of an engine and research for simultaneously securing operability and fuel efficiency competitiveness through multiple speed stages are conducted in the case of an automatic transmission.

However, in the automatic transmission, as the number of speed stages increases, the number of internal components increase, and as a result, mountability, cost, weight, transmission efficiency, and the like may still deteriorate.

Accordingly, development of a planetary gear train which may bring about improved efficiency with a small number of components may further increase fuel efficiency through the multiple speed stages.

In this aspect, in recent years, 8-speed automatic transmission tends to be implemented and the research and development of a planetary gear train capable of implementing more speed stages has also been actively conducted.

Since a span of gear ratios of the recent 8-speed automatic transmission is 6.5 to 7.5, the 8-speed automatic transmission has no great effect for improving fuel efficiency.

In addition, since step ratios between speed stages may not be increased or decreased linearly in a case in which a span of gear ratios of the 8-speed automatic transmission, driving efficiency of an engine and drivability of a vehicle may be deteriorated.

SUMMARY

The present disclosure has been made in an effort to provide a planetary gear train of an automatic transmission for a vehicle that improves power delivery performance and fuel efficiency by achieving nine forward speed stages and one reverse speed stage using a minimum number of constituent elements, by enlarging a span of gear ratios, and by linearly increasing or decreasing step ratios between speed stages.

One form of the present disclosure provides a planetary gear train of an automatic transmission for a vehicle that may include an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and six friction elements disposed between at least one rotation element among the twelve rotation elements and another rotation element or a transmission housing, wherein the input shaft is continuously connected to the second rotation element and selectively connected to the twelfth rotation element, the output shaft is continuously connected to the eleventh rotation element, the first rotation element is continuously connected to the fourth rotation element, the fifth rotation element is continuously connected to the eighth rotation element, the sixth rotation element is continuously connected to the tenth rotation element, the ninth rotation element is continuously connected to the eleventh rotation element, three friction elements among the six friction elements are operated at each speed stage.

The second rotation element may be is selectively connected to the seventh rotation element, the fourth rotation element may be selectively connected to the seventh rotation element, the third rotation element may be selectively connected to the eighth rotation element, the first rotation element may be selectively connected to the transmission housing, the sixth rotation element may be selectively connected to the transmission housing.

A sun gear, a planet carrier, and a ring gear of the first planetary gear set may be set as the first, second, and third rotation elements, a sun gear, a planet carrier, and a ring gear of the second planetary gear set may be set as the fourth, fifth, and sixth rotation elements, a sun gear, a planet carrier, and a ring gear of the third planetary gear set may be set as the seventh, eighth, and ninth rotation elements, and a sun gear, a planet carrier, and a ring gear of the fourth planetary gear set may be set as the tenth, eleventh, and twelfth rotation elements.

Another form of the present disclosure provides a planetary gear train of an automatic transmission for a vehicle that may include an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first rotation shaft engaging the first rotation element and the fourth rotation element and selectively connected to the transmission housing; a second rotation shaft engaging the second rotation element and directly connected to the input shaft; a third rotation shaft engaging the third rotation element; a fourth rotation shaft engaging the fifth rotation element and the eighth rotation element and selectively connected to the third rotation shaft; a fifth rotation shaft engaging the sixth rotation element and the tenth rotation element and selectively connected to the transmission housing; a sixth rotation shaft engaging the seventh rotation element and selectively connected to the first rotation shaft and the second rotation shaft; a seventh rotation shaft engaging the ninth rotation element and the eleventh rotation element and directly connected to the output shaft; and an eighth rotation shaft engaging the twelfth rotation element and selectively connected to the second rotation shaft and the input shaft.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the third planetary gear set may be a single pinion planetary gear set and may include a third sun gear that is the seventh rotation element, a third planet carrier that is the eighth rotation element, and a third ring gear that is the ninth rotation element, and the fourth planetary gear set may be a single pinion planetary gear set and may include a fourth sun gear that is the tenth rotation element, a fourth planet carrier that is the eleventh rotation element, and a fourth ring gear that is the twelfth rotation element.

The planetary gear train may further include a first clutch disposed between the input shaft and the eighth rotation shaft; a second clutch disposed between the second rotation shaft and the sixth rotation shaft; a third clutch disposed between the first rotation shaft and the sixth rotation shaft; a fourth clutch disposed between the third rotation shaft and the fourth rotation shaft; a first brake disposed between the first rotation shaft and the transmission housing; and a second brake disposed between the fifth rotation shaft and the transmission housing.

A first forward speed stage may be achieved by operation of the second and third clutches and the second brake, a second forward speed stage may be achieved by operation of the third and fourth clutches and the second brake, a third forward speed stage may be achieved by operation of the second and fourth clutches and the second brake, a fourth forward speed stage may be achieved by operation of the first and second clutches and the second brake, a fifth forward speed stage may be achieved by operation of the first, second and third clutches, a sixth forward speed stage may be achieved by operation of the first and second clutches and the first brake, a seventh forward speed stage may be achieved by operation of the first and fourth clutches and the first brake, an eighth forward speed stage may be achieved by operation of the second and fourth clutches and the first brake, a ninth forward speed stage may be achieved by operation of the third and fourth clutches and the first brake, a reverse speed stage may be achieved by operation of the second clutch and the first and second brakes.

Still another form of the present disclosure provides a planetary gear train of an automatic transmission for a vehicle that may include an input shaft receiving torque of an engine; an output shaft outputting changed torque; a first planetary gear set including a first sun gear, a first planet carrier, and a first ring gear; a second planetary gear set including a second sun gear, a second planet carrier, and a second ring gear; a third planetary gear set including a third sun gear, a third planet carrier, and a third ring gear; a fourth planetary gear set including a fourth sun gear, a fourth planet carrier, and a fourth ring gear; a first rotation shaft engaging the first sun gear and the second sun gear and selectively connected to a transmission housing; a second rotation shaft engaging the first planet carrier and directly connected to the input shaft; a third rotation shaft engaging the first ring gear; a fourth rotation shaft engaging the second planet carrier and the third planet carrier and selectively connected to the third rotation shaft; a fifth rotation shaft engaging the second ring gear and the fourth sun gear and selectively connected to the transmission housing; a sixth rotation shaft engaging the third sun gear and selectively connected to the first rotation shaft and the second rotation shaft; a seventh rotation shaft engaging the third ring gear and the fourth planet carrier directly connected to the output shaft; an eighth rotation shaft engaging the fourth ring gear and selectively connected to the second rotation shaft and the input shaft; and six friction elements disposed between at least one rotation shaft among the eight rotation shafts and another rotation shaft or the transmission housing.

Each of the first, second, third, and fourth planetary gear sets may be a single pinion planetary gear set.

The six friction elements may include a first clutch disposed between the input shaft and the eighth rotation shaft; a second clutch disposed between the second rotation shaft and the sixth rotation shaft; a third clutch disposed between the first rotation shaft and the sixth rotation shaft; a fourth clutch disposed between the third rotation shaft and the fourth rotation shaft; a first brake disposed between the first rotation shaft and the transmission housing; and a second brake disposed between the fifth rotation shaft and the transmission housing.

A first forward speed stage may be achieved by operation of the second and third clutches and the second brake, a second forward speed stage may be achieved by operation of the third and fourth clutches and the second brake, a third forward speed stage may be achieved by operation of the second and fourth clutches and the second brake, a fourth forward speed stage may be achieved by operation of the first and second clutches and the second brake, a fifth forward speed stage may be achieved by operation of the first, second and third clutches, a sixth forward speed stage may be achieved by operation of the first and second clutches and the first brake, a seventh forward speed stage may be achieved by operation of the first and fourth clutches and the first brake, an eighth forward speed stage may be achieved by operation of the second and fourth clutches and the first brake, a ninth forward speed stage may be achieved by operation of the third and fourth clutches and the first brake, a reverse speed stage may be achieved by operation of the second clutch and the first and second brakes.

One form of the present disclosure may achieve nine forward speed stages and one reverse speed stage by combining four planetary gear sets that are simple planetary gear sets with six friction elements.

In addition, engine driving efficiency may be increased by achieving a span of gear ratios to be greater than or equal to 9.0.

In addition, drivability such as acceleration before and after the shift and timing of engine speed may be improved by linearly increasing or decreasing step ratios between speed stages.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train according to one form of the present disclosure; and FIG. 2 is an operation chart of friction elements at each speed stage in the planetary gear train according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a schematic diagram of a planetary gear train according to one form of the present disclosure.

Referring to FIG. 1, a planetary gear train according to one form of the present disclosure includes first, second, third, and fourth planetary gear sets PG1, PG2, PG3, and PG4 disposed on the same axis, an input shaft IS, an output shaft OS, eight rotations shafts TM1 to TM8 engaging at least one rotation elements of the first, second, third, and fourth planetary gear sets PG1, PG2, PG3, and PG4, six friction elements C1 to C4 and B1 to B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is converted through a torque converter to be an input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a first pinion P1 externally engaged the first sun gear S1, and a first ring gear R1 of a third rotation element N3 internally engaged with the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sungear S4, and a fourth ring gear R4 of a twelfth rotation element N12 internally engaged with the fourth pinion P4.

The first rotation element N1 is directly connected to the fourth rotation element N4, the fifth rotation element N5 is directly connected to the eighth rotation element N8, the sixth rotation element N6 is directly connected to the tenth rotation element N10, the ninth rotation element N9 is directly connected to the eleventh rotation element N11, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 engages the first rotation element N1, and the fourth rotation element N4.

The second rotation shaft TM2 engages the second rotation element N2, and is directly connected to the input shaft IS so as to be always operated as an input element.

The third rotation shaft TM3 engages the third rotation element N3.

The fourth rotation shaft TM4 engages the fifth rotation element N5 and the eighth rotation element N8, and is selectively connected to the third rotation shaft TM3.

The fifth rotation shaft TM5 engages the sixth rotation element N6 and the tenth rotation element N10, and is selectively connected to the transmission housing H.

The sixth rotation shaft TM6 engages the seventh rotation element N7, is selectively connected to the first rotation shaft TM1 and the second first rotation shaft TM2.

The seventh rotation shaft TM7 engages the ninth rotation element N9 and the eleventh rotation element N11, and is directly connected to the output shaft OS so as to be always operated as an output element.

The eighth rotation shaft TM8 engages the twelfth rotation element N12, and is selectively connected to the input shaft IS.

In addition, four clutches C1, C2, C3, and C4 which are friction elements are disposed at connection portions between any two rotation shafts.

In addition, two brakes B1 and B2 which are friction elements are disposed at connection portions between any one rotation shaft and the transmission housing H.

The six friction elements C1 to C4 and B1 to B2 will be described in further detail.

The first clutch C1 is disposed between the input shaft IS and the eighth rotation shaft TM8 and selectively connects the input shaft IS and the eighth rotation shaft TM8.

The second clutch C2 is disposed between the second rotation shaft TM2 and the sixth rotation shaft TM6 and selectively connects the second rotation shaft TM2 and the sixth rotation shaft TM6.

The third clutch C3 is disposed between the first rotation shaft TM1 and the sixth rotation shaft TM6 and selectively connects the first rotation shaft TM1 and the sixth rotation shaft TM6.

The fourth clutch C4 is disposed between the third rotation shaft TM3 and the fourth rotation shaft TM4 and selectively connects the third rotation shaft TM3 and the fourth rotation shaft TM4.

The first brake B1 is disposed between the first rotation shaft TM1 and the transmission housing H and causes the first rotation shaft TM1 to be operated as a selective fixed element.

The second brake B2 is disposed between the fifth rotation shaft TM5 and the transmission housing H and causes the fifth rotation shaft TM5 to be operated as a selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed stage in the planetary gear train according to one form of the present disclosure.

As shown in FIG. 2, three friction elements are operated at each speed stage in the planetary gear train according to a form of the present disclosure. Shifting processes in one form of the present disclosure will be described in further detail.

If the second and third clutches C2 and C3 and the second brake B2 are operated at a first forward speed stage D1, the sixth rotation shaft TM6 is connected to the second rotation shaft TM2 and the first rotation shaft TM1, rotation speed of the input shaft IS is input to the second rotation shaft TM2, and the fifth rotation shaft TM5 is operated as the fixed element. Therefore, the first forward speed stage is achieved.

If the third and fourth clutches C3 and C4 and the second brake B2 are operated at a second forward speed stage D2, the first rotation shaft TM1 is connected to the sixth rotation shaft TM6, the third rotation shaft TM3 is connected to the fourth rotation shaft TM4, rotation speed of the input shaft IS is input to the second rotation shaft TM2, and the fifth rotation shaft TM5 is operated as the fixed element. Therefore, the second forward speed stage is achieved.

If the second and fourth clutches C2 and C4 and C4 and the second brake B2 are operated at a third forward speed stage D3, the second rotation shaft TM2 is connected to the sixth rotation shaft TM6, rotation speed of the input shaft IS is input to the second rotation shaft TM2, and the fifth rotation shaft TM5 is operated as the fixed element. Therefore, the third forward speed stage is achieved.

If the first and second clutches C1 and C2 and the second brake B2 are operated at a fourth forward speed stage D4, the input shaft IS is connected to the eighth rotation shaft TM8, the second rotation shaft TM2 is connected to the sixth rotation shaft TM6, rotation speed of the input shaft IS is input to the second rotation shaft TM2, and the fifth rotation shaft TM5 is operated as the fixed element. Therefore, the fourth forward speed stage is achieved.

If the first, second and third clutches C1, C2, and C3 are operated at a fifth forward speed stage D5, the input shaft IS is connected to the eighth rotation shaft TM8, the sixth rotation shaft TM6 is connected to the second rotation shaft TM2 and the first rotation shaft TM1. Therefore, all the planetary gear sets become direct-coupling states. At this state, if rotation speed of the input shaft IS is input to the second rotation shaft TM2, the fifth forward speed stage is achieved. At the fifth forward speed stage, rotation speed that is the same as that of the input shaft IS is output.

If the first and second clutches C1 and C2 and the first brake B1 are operated at a sixth forward speed stage D6, the input shaft IS is connected to the eighth rotation shaft TM8, the second rotation shaft TM2 is connected to the sixth rotation shaft TM6, rotation speed of the input shaft IS is input to the second rotation shaft TM2, and the first rotation shaft TM1 is operated as the fixed element. Therefore, the sixth forward speed stage is achieved.

If the first and fourth clutches C1 and C4 and the first brake B1 are operated at a seventh forward speed stage D7, the input shaft IS is connected to the eighth rotation shaft TM8, the third rotation shaft TM3 is connected to the fourth rotation shaft TM4, rotation speed of the input shaft IS is input to the second rotation shaft TM2, and the first rotation shaft TM1 is operated as the fixed element. Therefore, the seventh forward speed stage is achieved.

If the second and fourth clutches C2 and C4 and the first brake B1 are operated at an eighth forward speed stage D8, the second rotation shaft TM2 is connected to the sixth rotation shaft TM6, the third rotation shaft TM3 is connected to the fourth rotation shaft TM4, rotation speed of the input shaft IS is input to the second rotation shaft TM2, and the first rotation shaft TM1 is operated as the fixed element. Therefore, the eighth forward speed stage is achieved.

If the third and fourth clutches C3 and C4 and the first brake B1 B2 are operated at a ninth forward speed stage D9, the first rotation shaft TM1 is connected to the sixth rotation shaft TM6, the third rotation shaft TM3 is connected to the fourth rotation shaft TM4, rotation speed of the input shaft IS is input to the second rotation shaft TM2, and the first rotation shaft TM1 is operated as the fixed element. Therefore, the ninth forward speed stage is achieved.

If the second clutch C2 and first and second brakes B1 and B2 are operated at a reverse speed stage REV, the second rotation shaft TM2 is connected to the sixth rotation shaft TM6, rotation speed of the input shaft IS is input to the second rotation shaft TM2, and the first rotation shaft TM1 and the fifth rotation shaft TM5 are operated as the fixed elements. Therefore, the reverse speed stage is achieved.

The planetary gear train according to one form of the present disclosure may achieve nine forward speed stages and one reverse speed stage by controlling four planetary gear sets PG1, PG2, PG3, and PG4 with four clutches C1, C2, C3, and C4 and two brakes B1 and B2.

In addition, step ratios between speed stages are 1.2 or more except for between the sixth and seventh forward speed stages and between the eighth and ninth forward speed stages and linearity of step ratios between speed stages can be secured. Thus, drivability such as acceleration before and after the shift and timing of engine speed may be improved.

In addition, engine driving efficiency may be maximized by achieving a span of gear ratios to be greater than or equal to 9.0.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle having speed stages, the planetary gear train comprising:
    an input shaft receiving torque of an engine;
    an output shaft outputting changed torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements; and
    six friction elements each disposed between at least one rotation element among the twelve rotation elements and another rotation element among the twelve rotation elements or a transmission housing,
    wherein the input shaft is directly connected to the second rotation element and selectively connected to the twelfth rotation element, and one of the six friction elements directly connects the input shaft and the twelfth rotation element,
    the output shaft is directly connected to the eleventh rotation element,
    the first rotation element is directly connected to the fourth rotation element,
    the fifth rotation element is directly connected to the eighth rotation element,
    the sixth rotation element is directly connected to the tenth rotation element, the ninth rotation element is directly connected to the eleventh rotation element,
three friction elements among the six friction elements are operated at each speed stage.

2. The planetary gear train of claim 1,
wherein the second rotation element is selectively connected to the seventh rotation element,
the fourth rotation element is selectively connected to the seventh rotation element,
the third rotation element is selectively connected to the eighth rotation element,
the first rotation element is selectively connected to the transmission housing,
the sixth rotation element is selectively connected to the transmission housing.

3. The planetary gear train of claim 1,
wherein a sun gear, a planet carrier, and a ring gear of the first planetary gear set are set as the first, second, and third rotation elements,
a sun gear, a planet carrier, and a ring gear of the second planetary gear set are set as the fourth, fifth, and sixth rotation elements,
a sun gear, a planet carrier, and a ring gear of the third planetary gear set are set as the seventh, eighth, and ninth rotation elements, and
a sun gear, a planet carrier, and a ring gear of the fourth planetary gear set are set as the tenth, eleventh, and twelfth rotation elements.

4. A planetary gear train of an automatic transmission for a vehicle, comprising:
an input shaft receiving torque of an engine;
an output shaft outputting changed torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a first rotation shaft engaging the first rotation element and the fourth rotation element and selectively connected to the transmission housing;
a second rotation shaft engaging the second rotation element and directly connected to the input shaft;
a third rotation shaft engaging the third rotation element;
a fourth rotation shaft engaging the fifth rotation element and the eighth rotation element and selectively connected to the third rotation shaft;
a fifth rotation shaft engaging the sixth rotation element and the tenth rotation element and selectively connected to the transmission housing;
a sixth rotation shaft engaging the seventh rotation element and selectively connected to the first rotation shaft and the second rotation shaft;
a seventh rotation shaft engaging the ninth rotation element and the eleventh rotation element and directly connected to the output shaft; and
an eighth rotation shaft engaging the twelfth rotation element and selectively connected to the second rotation shaft and the input shaft.

5. The planetary gear train of claim 4,
wherein the first planetary gear set is a single pinion planetary gear set and includes a first sun gear that is the first rotation element, a first planet carrier that is the second rotation element, and a first ring gear that is the third rotation element,
the second planetary gear set is a single pinion planetary gear set and includes a second sun gear that is the fourth rotation element, a second planet carrier that is the fifth rotation element, and a second ring gear that is the sixth rotation element,
the third planetary gear set is a single pinion planetary gear set and includes a third sun gear that is the seventh rotation element, a third planet carrier that is the eighth rotation element, and a third ring gear that is the ninth rotation element, and
the fourth planetary gear set is a single pinion planetary gear set and includes a fourth sun gear that is the tenth rotation element, a fourth planet carrier that is the eleventh rotation element, and a fourth ring gear that is the twelfth rotation element.

6. The planetary gear train of claim 4, further comprising:
a first clutch disposed between the input shaft and the eighth rotation shaft;
a second clutch disposed between the second rotation shaft and the sixth rotation shaft;
a third clutch disposed between the first rotation shaft and the sixth rotation shaft;
a fourth clutch disposed between the third rotation shaft and the fourth rotation shaft;
a first brake disposed between the first rotation shaft and the transmission housing; and
a second brake disposed between the fifth rotation shaft and the transmission housing.

7. The planetary gear train of claim 6,
wherein a first forward speed stage is achieved by operation of the second and third clutches and the second brake,
a second forward speed stage is achieved by operation of the third and fourth clutches and the second brake,
a third forward speed stage is achieved by operation of the second and fourth clutches and the second brake,
a fourth forward speed stage is achieved by operation of the first and second clutches and the second brake,
a fifth forward speed stage is achieved by operation of the first, second and third clutches,
a sixth forward speed stage is achieved by operation of the first and second clutches and the first brake,
a seventh forward speed stage is achieved by operation of the first and fourth clutches and the first brake,
an eighth forward speed stage is achieved by operation of the second and fourth clutches and the first brake,
a ninth forward speed stage is achieved by operation of the third and fourth clutches and the first brake,
a reverse speed stage is achieved by operation of the second clutch and the first and second brakes.

8. A planetary gear train of an automatic transmission for a vehicle, comprising:
an input shaft receiving torque of an engine;
an output shaft outputting changed torque;
a first planetary gear set including a first sun gear, a first planet carrier, and a first ring gear;
a second planetary gear set including a second sun gear, a second planet carrier, and a second ring gear;
a third planetary gear set including a third sun gear, a third planet carrier, and a third ring gear;
a fourth planetary gear set including a fourth sun gear, a fourth planet carrier, and a fourth ring gear;
a first rotation shaft engaging the first sun gear and the second sun gear and selectively connected to a transmission housing;
a second rotation shaft engaging the first planet carrier and directly connected to the input shaft;

a third rotation shaft engaging the first ring gear;

a fourth rotation shaft engaging the second planet carrier and the third planet carrier and selectively connected to the third rotation shaft;

a fifth rotation shaft engaging the second ring gear and the fourth sun gear and selectively connected to the transmission housing;

a sixth rotation shaft engaging the third sun gear and selectively connected to the first rotation shaft and the second rotation shaft;

a seventh rotation shaft engaging the third ring gear and the fourth planet carrier directly connected to the output shaft;

an eighth rotation shaft engaging the fourth ring gear and selectively connected to the second rotation shaft and the input shaft; and six friction elements each disposed between at least one rotation shaft among the eight rotation shafts and another rotation shaft among the eight rotation shafts or the transmission housing.

9. The planetary gear train of claim 8, wherein each of the first, second, third, and fourth planetary gear sets is a single pinion planetary gear set.

10. The planetary gear train of claim 8, wherein the six friction elements include a first clutch disposed between the input shaft and the eighth rotation shaft;

a second clutch disposed between the second rotation shaft and the sixth rotation shaft;

a third clutch disposed between the first rotation shaft and the sixth rotation shaft;

a fourth clutch disposed between the third rotation shaft and the fourth rotation shaft;

a first brake disposed between the first rotation shaft and the transmission housing; and a second brake disposed between the fifth rotation shaft and the transmission housing.

11. The planetary gear train of claim 10, wherein a first forward speed stage is achieved by operation of the second and third clutches and the second brake, a second forward speed stage is achieved by operation of the third and fourth clutches and the second brake, a third forward speed stage is achieved by operation of the second and fourth clutches and the second brake, a fourth forward speed stage is achieved by operation of the first and second clutches and the second brake, a fifth forward speed stage is achieved by operation of the first, second and third clutches, a sixth forward speed stage is achieved by operation of the first and second clutches and the first brake, a seventh forward speed stage is achieved by operation of the first and fourth clutches and the first brake, an eighth forward speed stage is achieved by operation of the second and fourth clutches and the first brake, a ninth forward speed stage is achieved by operation of the third and fourth clutches and the first brake, a reverse speed stage is achieved by operation of the second clutch and the first and second brakes.

* * * * *